Sept. 23, 1952     O. R. SMITH     2,611,848

RADIANT HEAT WELDING EQUIPMENT

Filed May 25, 1950

INVENTOR.
OLIVER ROSS SMITH
BY
Charles E. Lightfoot
Attorney

Patented Sept. 23, 1952

2,611,848

UNITED STATES PATENT OFFICE 2,611,848

RADIANT HEAT WELDING EQUIPMENT

Oliver Ross Smith, Fort Worth, Tex.

Application May 25, 1950, Serial No. 164,155

7 Claims. (Cl. 219—6)

This invention relates to radiant heat welding equipment, and more particularly to welding equipment wherein heating electrodes are disposed adjacent the parts to be welded in position to heat the welding zone entirely by radiation from the electrodes The invention is particularly adaptable for use in welding objects such as metal pipes, which may be advantageously welded by the application of radiant heat to uniformly raise the temperature of the material throughout the entire welding zone or zone of fusion of the metal to the required welding heat and forcing the parts together under pressure while so heated.

The chief object of the invention is to provide welding equipment making use of radiant heat and pressure to secure complete and uniform coalescence of the material of the weld and embodying means for accurately controlling the temperature and distribution of the heat throughout the entire welding zone.

A further object of the invention is to provide welding equipment adapted for use in welding pipes and employing electrodes shaped in accordance with the curvature of the work to assure rapid and uniform heating of the material in the zone of the weld.

Another object of the invention is the provision of welding equipment adapted for use in butt welding pipe, which equipment includes heat retaining means designed to be quickly and easily positioned about the pipe, and supporting therein curved electrodes arranged to heat the welding zone or zone of fusion by radiation.

A still further object of the invention is to provide welding equipment especially adapted for welding by radiant heat, and which is of simple design and rugged construction, capable of withstanding the hard usage and rough treatment to which such apparatus is customarily subjected.

Other objects and advantages of the invention will be apparent from the following detailed description constituting a specification of the same when taken in conjunction with the annexed drawings, wherein—

Figure 2:
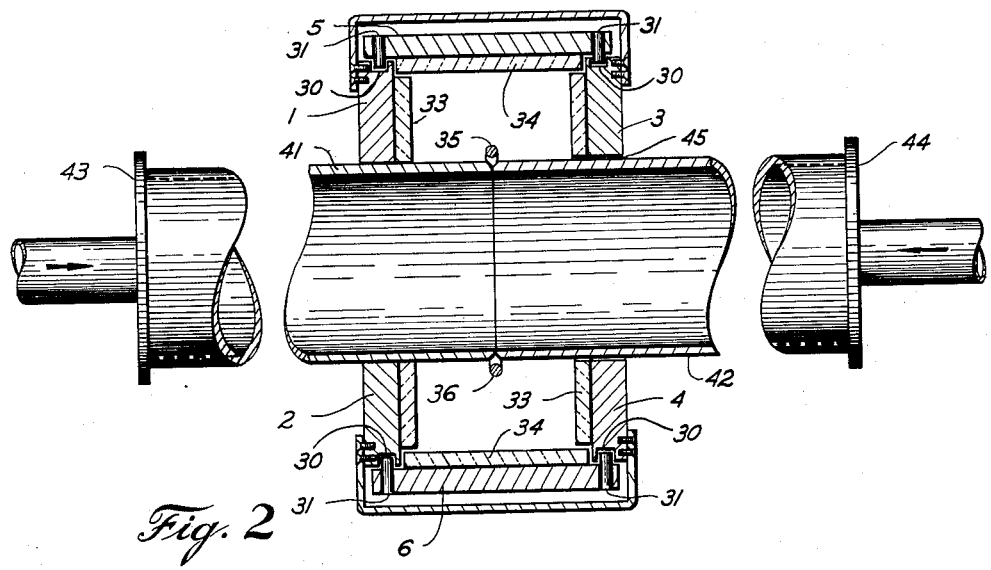
Figure 2 is a vertical, central cross-sectional view, showing the equipment in position for carrying out the welding operation.
Figure 1:
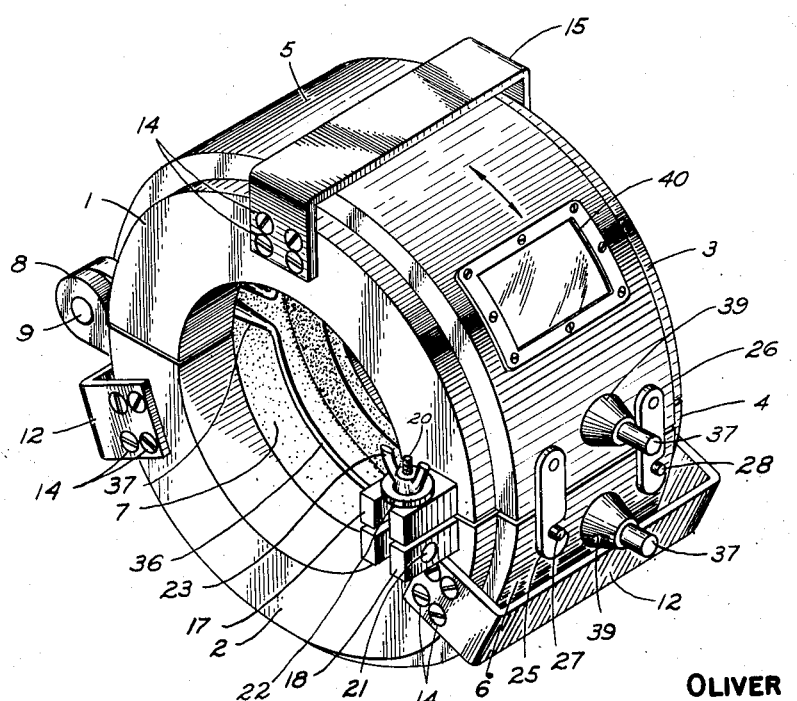
Figure 1 is a perspective view of the invention in assembled condition.

Referring now more particularly to the drawings, the invention comprises a casing structure adapted to be positioned about the objects to be welded over the welding zone thereof, the casing in the present illustration having ring-like side members each made up of semi-annular sections 1, 2 and 3, 4. The ring-like side members are spaced apart and the interval between them is closed by a generally cylindrical member made up of semi-cylindrical sections 5 and 6, so that an annular chamber indicated at 7 is formed about the zone of the weld, when the casing is in position for the welding operation.

The semi-annular sections 1 and 2 are preferably secured together by a hinge 8 having a hinge pin 9, while the sections 3 and 4 and the semi-cylindrical sections 6 and 7 are not so connected, but are independently supported. Thus, the casing is made in two parts and is adapted to swing open about the hinge 8, so that the casing may be readily positioned about the welding zone of the pipe or other object to be welded.

Connecting members 12, 12 are suitably secured, as by screws 14, to the semi-annular members 2 and 4, and preferably extend across the semi-cylindrical section 5 in spaced relation thereto. A similar connecting member 15 likewise connects the semi-annular members 1 and 3, so that the parts of the casing are retained in assembled condition and the two halves can be swung apart to place the casing in operative position.

The members 1 and 2 have slotted lugs 17 and 18 thereon, at the ends opposite the hinge 8, the lug 18 having an eye bolt 20 pivoted thereto by a pin 21, which bolt carries a washer 27 and wing nut 23, and is adapted to be moved into the slot in the lug 17 to retain the casing closed.

The semi-cylindrical members 5 and 6 may be provided with latches 25 and 26 adapted to cooperate with pins 27 and 28, respectively, to hold these members together at one side of the casing and similar latching means may be provided on the opposite ends of the semi-cylindrical members for the same purpose.

Grooves such as those indicated at 30, 30 may be provided in the semi-annular members and each of the semi-cylindrical members may have pins 31, 31 extending into the grooves, whereby relate lateral movement of the parts is prevented and the members 5 and 6 may be permitted to rotate to a limited extent about the casing.

Within the casing the members 1, 2, 3 and 4 may be covered by insulating lining material 33 of asbestos or the like, and the members 5 and 6 may likewise carry similar lining 34 to retain the heat in the annular chamber and prevent damage to the walls of the casing.

There are the electrodes 35 and 36 which are preferably formed of carbon or other high resistance material capable of becoming highly heated by the passage of electric current therethrough. The electrodes are mounted inside the casing to be positioned adjacent the welding zone, and they are preferably generally semi-circular in shape, having somewhat thickened outwardly directed end portions 37. The portions 37 of the electrodes extend through ceramic insulators 39, secured in openings in the members 5 and 6, so that the electrodes may be connected to suitable conductors, not shown, leading to a source of electric current. Electrodes 35 and 36 are shaped to correspond closely to the curvature of the object being welded and are uniformly radially spaced somewhat therefrom in order that the heating may be accomplished by radiation. The electrodes have their end portions 37 spaced slightly apart to prevent any possibility of arcing between the electrodes.

A series of window openings, such as that shown at 40, may be provided in the casing, which openings are fitted with tinted glass and may have a plate of heat resistant glass facing the interior of the chamber 6 to prevent breakage from the heat of the electrodes.

The welding equipment as described above may, for example, be used in welding together two sections of pipe, such as those shown at 41 and 42 in Figure 2, which may be placed with their ends in abutting relation in a hydraulic press or the like having pressure applying heads such as 43 and 44 in engagement with the other ends of the pipe sections.

The welding equipment is opened by loosening the wing nut 23 and swinging bolt 20 out of the lug 17, and unlatching the latches 25 and 26. The casing is then opened about the hinge 8, and positioned over the pipe sections 41, 42, and closed so that the abutting ends of the pipe sections are within the annular chamber and the electrodes 35 and 36 are positioned in encircling relation to the abutting ends. In this condition of the apparatus the semi-annular members 1 and 2 may closely engage the pipe section 41 and be tightly clamped thereon when the bolt 20 is swung into the slot in lug 17 and the wing nut 23 tightened. The semi-annular members 3 and 4, on the other hand, will be securely retained in position by the connecting members 12, 12 and 15, but may fit loosely about the pipe section 42 as is seen at 45 in Figure 2. The latches 25 and 26 are then relatched and the equipment is in condition for forming the weld.

Sufficient pressure is applied to the pipe sections through the pressure applying heads 43 and 44 to maintain the abutting ends firmly in contact, and current is passed through the electrodes 35 and 36 until the same are heated to a temperature to heat the metal in the zone of the weld to fusion. Continued application of pressure to the pipe sections while the welding zone is heated as described results in the production of a strong and uniform weld between the parts.

At the locations where the end portions 37 of the electrodes are spaced apart there are slight gaps in the continuity of the circle of radiant heat about the welding zone, and in order to assure the proper fusion entirely about the perimeter of the weld, the semi-cylindrical members 5 and 6 may be slightly rotated back and forth during the welding operation. In this manner any discontinuity in the heating of the metal in the zone of fusion may be eliminated and uniform fusion secured.

It will be apparent from the above description that welds of high quality can be easily produced by the use of the invention and that the welding conditions are under the complete control of the operator at all times.

By suitably adjusting the size of the electrodes and the distance of the same from the work, and by providing suitable means under the control of the operator for regulating the pressure applied to the pipe sections and the current supplied to the electrodes, the conditions of temperature and pressure in the welding zone of the material can be accurately controlled.

It will thus be seen that the invention provides welding equipment of simple construction which is easily applied and readily kept under the control of the operator, and by the use of which welds of uniform quality and strength can be rapidly and accurately formed.

While the invention is shown and described in connection with a particular embodiment of the same, it will be understood that this is by way of illustration only, and numerous changes in the structure and arrangement of the various parts can be made without departing from the spirit of the invention or the scope of the appended claims.

Having thus clearly shown and described the invention, what is claimed as new and desired to secure by Letters Patent is:

1. Welding equipment for use in welding pipes or the like comprising electrode means disposed circumferentially of a pipe in radially spaced relation thereto, and means for moving said electrode means circumferentially of said pipe.

2. Welding equipment for use in welding pipes or the like comprising a casing adapted to be positioned about a pipe, electrode means supported in said casing in radially spaced relation to the pipe, and means operatively associated with said electrode means for moving said electrode means circumferentially of said pipe.

3. In welding equipment for use in welding pipe or the like, spaced pipe encircling members, electrode supporting means disposed on said members for movement circumferentially of the pipe, and electrodes carried on said supporting means in radially spaced relation to said pipe.

4. Welding equipment for use in welding pipes or the like, comprising a casing adapted to be positioned about the abutting ends of two sections of pipe supported in endwise abutting relation, curved electrodes movably supported on the casing in radially spaced relation to said abutting ends and movable circumferentially of said ends.

5. Welding equipment for use in welding pipes or the like comprising a casing adapted to be positioned about the abutting ends of two sections of pipe supported in endwise abutting relation, said casing having side walls engageable with the pipe sections to support the casing on the sections and an outer wall connecting said side walls and movable thereon circumferentially of said sections, and curved electrodes carried by said outer wall in radially spaced relation to said abutting ends.

6. Welding equipment for use in welding pipes or the like comprising a substantially cylindrical casing adapted to be positioned about the abutting ends of two sections of pipe supported in endwise abutting relation, said casing having substantially semi-circular elements forming side walls and engageable about said pipe sections to support the casing on the pipe sections and a substantially cylindrical wall movably carried on said side walls and movable circumferentially about said sections, and curved electrodes carried by said cylindrical wall in radially spaced relation to said abutting ends.

7. Welding equipment for use in welding pipes or the like comprising a cylindrical casing adapted to be positioned about the abutting ends of two sections of pipe supported in endwise abutting relation, said casing having semi-circular elements forming side walls and engageable about said pipe sections to support the casing on the pipe sections and semi-cylindrical elements forming a cylindrical wall, interengageable means connecting said cylindrical wall to said side wall for circumferential movement about said sections, and substantially semi-circular electrodes carried by said cylindrical wall in radially spaced relation to said abutting ends.

OLIVER ROSS SMITH.

REFERENCES CITED

The following references are of record in the file of this patent:

UNITED STATES PATENTS

| Number | Name | Date |
|---|---|---|
| 423,966 | Thomson | Mar. 25, 1890 |
| 430,839 | Dewey | June 24, 1890 |
| 1,115,195 | Hendee | Oct. 27, 1914 |
| 1,775,311 | Halle | Sept. 9, 1930 |
| 2,151,840 | Dichter | Mar. 28, 1939 |
| 2,193,490 | Rehse | Mar. 12, 1940 |